INVENTORS C. E. BROOKS
A. E. JOEL, JR.
M. E. KROM

BY ~Turner~

ATTORNEY

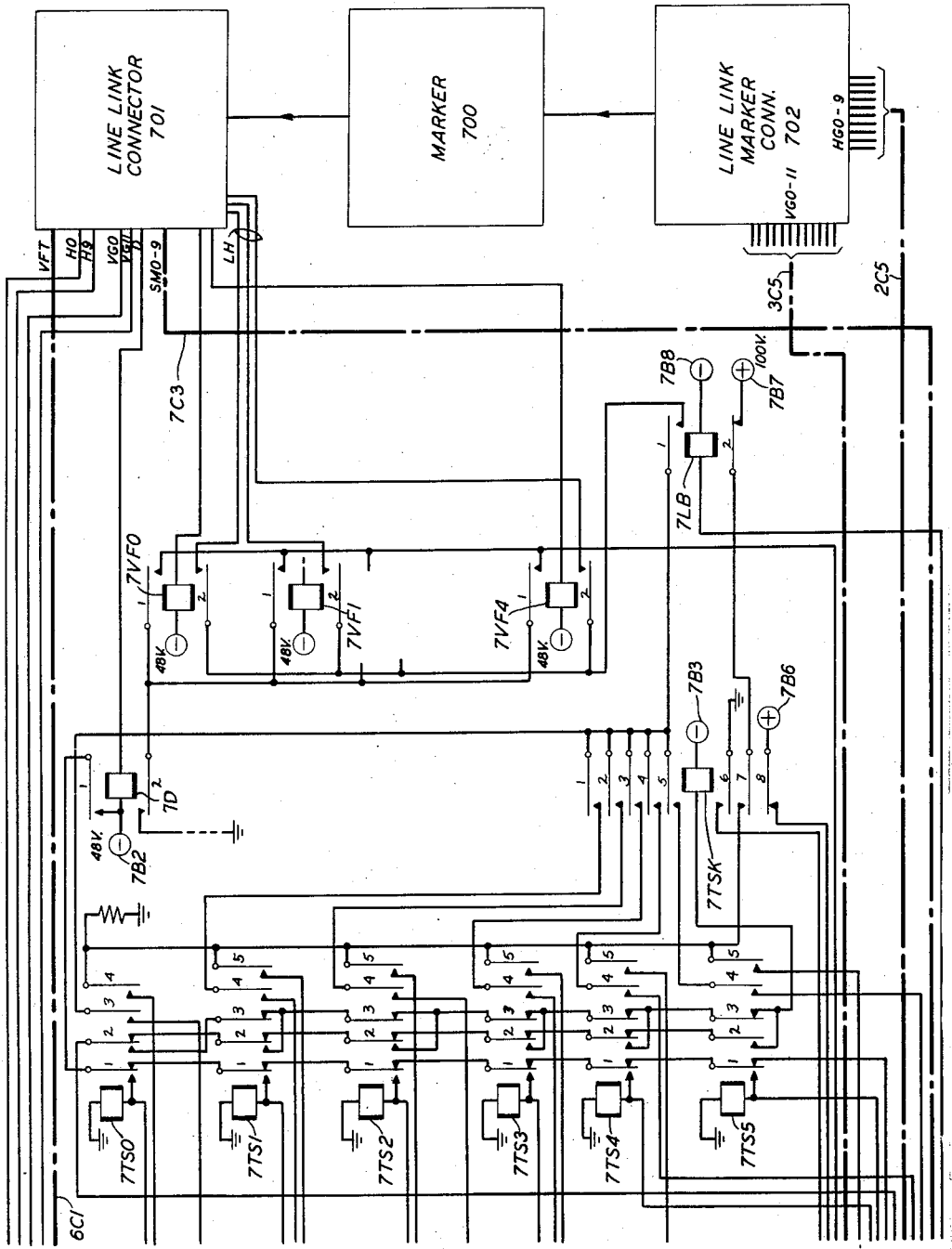

FIG. 9

| FOR SUBS. LINE NOS. | IN VERT. GROUP NO. | LINE UNIT 0 | 1 | 2 | 3 | 4 | 5 | TRUNK PREFERENCE |
|---|---|---|---|---|---|---|---|---|
| | | TO TRUNK NUMBER | | | | | | |
| 00-04 | 0 | 1 | 6 | 0 | 7 | 8 | 9 | 0,1,7,6,8,9 |
| 05-09 | 1 | 3 | 4 | 0 | 7 | 8 | 9 | 4,7,3,0,8,9 |
| 10-14 | 2 | 1 | 6 | 2 | 5 | 8 | 9 | 6,2,1,5,8,9 |
| 15-19 | 3 | 3 | 4 | 2 | 5 | 8 | 9 | 2,3,5,4,8,9 |
| 20-24 | 4 | 3 | 6 | 2 | 7 | 8 | 9 | 3,6,2,7,8,9 |
| 25-29 | 5 | 0 | 5 | 2 | 7 | 8 | 9 | 7,5,0,2,8,9 |
| 30-34 | 6 | 3 | 6 | 1 | 4 | 8 | 9 | 1,4,6,3,8,9 |
| 35-39 | 7 | 0 | 5 | 1 | 4 | 8 | 9 | 5,0,4,1,8,9 |
| 40-44 | 8 | 0 | 2 | 4 | 6 | 8 | 9 | 2,0,6,4,8,9 |
| 45-49 | 9 | 5 | 7 | 4 | 6 | 8 | 9 | 4,6,5,7,8,9 |
| 50-54 | 10 | 0 | 2 | 1 | 3 | 8 | 9 | 1,3,0,2,8,9 |
| 55-59 | 11 | 5 | 7 | 1 | 3 | 8 | 9 | 7,5,3,1,8,9 |

FIG. 10

| FOR VERT. GROUP NOS. | CONNECT TS0 | TS1 | TS2 | TS3 | E | F | G | H |
|---|---|---|---|---|---|---|---|---|
| | RELAY WINDING RESISTANCE TO VG-RELAY ARMATURE | | | | | | | |
| 0 | 1 | 2 | 8 | 7 | 3 | 4 | 5 | 6 |
| 1 | 5 | 8 | 4 | 7 | 2 | 3 | 1 | 6 |
| 2 | 7 | 3 | 2 | 6 | 1 | 4 | 5 | 8 |
| 3 | 3 | 4 | 6 | 5 | 1 | 2 | 7 | 8 |
| 4 | 4 | 7 | 3 | 8 | 1 | 2 | 5 | 6 |
| 5 | 8 | 6 | 1 | 3 | 2 | 4 | 5 | 7 |
| 6 | 2 | 5 | 7 | 4 | 1 | 3 | 6 | 8 |
| 7 | 6 | 1 | 5 | 2 | 3 | 4 | 7 | 8 |
| 8 | 3 | 1 | 7 | 5 | 2 | 4 | 6 | 8 |
| 9 | 5 | 7 | 6 | 8 | 1 | 2 | 3 | 4 |
| 10 | 2 | 4 | 1 | 3 | 5 | 6 | 7 | 8 |
| 11 | 8 | 6 | 4 | 2 | 1 | 3 | 5 | 7 |

FIG. 11

| VERT. GROUP | CONNECT H REL. ARMATURE 12 | 13 | 14 | 15 | 16 | 17 | 18 | 19 | C0 | C1 | C2 | C3 | C4 | C5 | C6 | C7 |
|---|---|---|---|---|---|---|---|---|---|---|---|---|---|---|---|---|
| | TO VG-REAY ARMATURE | | | | | | | | | | | | | | | |
| 0 | 9 | 10 | - | - | - | - | 12 | 11 | 14 | 15 | - | - | - | - | 17 | 16 |
| 1 | 12 | - | - | 11 | 9 | - | - | 10 | 17 | - | - | 16 | 14 | - | - | 15 |
| 2 | - | 11 | 10 | - | - | 12 | 9 | - | - | 16 | 15 | - | - | 17 | 14 | - |
| 3 | - | - | 9 | 10 | 12 | 11 | - | - | - | - | 14 | 15 | 17 | 16 | - | - |
| 4 | - | - | 11 | 9 | - | - | 10 | 12 | - | - | 16 | 14 | - | - | 15 | 17 |
| 5 | 11 | - | 12 | - | - | 10 | - | 9 | 16 | - | 17 | - | - | 15 | - | 14 |
| 6 | - | 9 | - | 12 | 10 | - | 11 | - | - | 14 | - | 17 | 15 | - | 16 | - |
| 7 | 10 | 12 | - | - | 11 | 9 | - | - | 15 | 17 | - | - | 16 | 14 | - | - |
| 8 | 10 | - | 9 | - | 12 | - | 11 | - | 15 | - | 14 | - | 17 | - | 11 | - |
| 9 | - | - | - | - | 9 | 11 | 10 | 12 | - | - | - | - | 14 | 16 | 15 | 17 |
| 10 | 11 | 9 | 12 | 10 | - | - | - | - | 16 | 14 | 17 | 15 | - | - | - | - |
| 11 | - | 12 | - | 11 | - | 10 | - | 9 | - | 17 | - | 16 | - | 15 | - | 14 |

INVENTORS: C. E. BROOKS
A. E. JOEL, JR.
M. E. KROM

BY

ATTORNEY

United States Patent Office 2,853,554
Patented Sept. 23, 1958

2,853,554

TRUNK SELECTION SYSTEM

Chester E. Brooks, Montvale, Amos E. Joel, Jr., South Orange, and Myron E. Krom, Convent Station, N. J., assignors to Bell Telephone Laboratories, Incorporated, New York, N. Y., a corporation of New York Application December 28, 1955, Serial No. 555,929

16 Claims. (Cl. 179—18)

This invention relates to trunking systems, and more particularly to trunking systems for remote line concentrators which connect a number of subscriber lines to a central office.

A line concentrator is essentially a switching device which provides for connections between a large plurality of subscriber lines and a small plurality of talking trunks. The talking trunks connect the line concentrator with the central office. Line concentrator systems effect considerable savings in the cost of operation of the telephone plant by avoiding the necessity of providing a separate direct connection from the central office to each subscriber line.

Prior line concentrators provide for a connection from any one of the subscriber lines to any one of the talking trunks. For each possible connection between a line and a trunk, individual connecting equipment is required. Such individual connecting equipment is referred to as a crosspoint, and may include a relay, a gas tube, or part of a crossbar switch. By way of example, in the system disclosed in the Patent 2,532,097 which was granted to R. E. Hersey on November 28, 1950, 100 lines are individually connectable to ten trunks. In such a line concentrator system, 1000 crosspoints are required. The crosspoints represent the major outside plant cost of line concentrator systems because they are utilized in such large numbers.

It is an object of the present invention to reduce the number of crosspoints without affecting the quality of the telephone service.

In accordance with an illustrative embodiment of the present invention the number of crosspoints is greatly reduced by the use of a "random slip" multiple. The term random slip indicates that the lines have access to different combinations of trunks, and that the number of trunks in each multiple is less than the total number of trunks provided for a concentrator.

A feature of the present invention relates to means for establishing a preference for the selection of the trunks in each slip multiple. The preference selection distributes the calling load because a trunk which is common to more than one multiple may have a different preference in each multiple. The same preference circuit is utilized, in common, by all the multiples for the preference selection of the trunks. By utilizing preference selection on a slip multiple basis, the number of concentrator crosspoints are greatly reduced without decreasing the quality of service provided to the subscribers.

Each multiple includes a plurality of crosspoints for establishing a connection from a subscriber line to one of the multipled trunks. In order for a connection to be established, the crosspoint must be marked at both line and trunk ends. The preference selector circuit at the central office selects the preferred idle trunk in the multiple for the line being served, and applies a connect mark potential to the trunk ends of the crosspoints connected thereto. During the operation of the preference selector circuit, signals identifying the line are supplied to the concentrator for marking the line side of the multipled crosspoints connected to the line. Only one crosspoint is marked at both sides. The slip multiple connections are utilized at both the concentrator and the central office because the identity of the connectable trunks is required at both locations.

Another feature of the present invention pertains to means for providing for the utilization of common least preferred trunks. Each multiple has two grades of trunks: One in which the trunks are connection on a random slip basis, and another in which common trunks are utilized when the others in the multiple are busy. If full random slip connections are utilized, availability of idle trunks for a busy group of lines may be quite small. Using graded multiples makes available the least preferred common trunks when the others are busy. The likelihood of the common trunks being available is probable because they are always the least preferred trunks in each multiple. In other words, the graded multiple is utilized to distribute the availability of trunks when a group of lines initiates more than its proportionate share of calls, or service requests. A trunk common to each multiple, moreover, allows for the ready testing of any line from the central office since the trunk is individually connectable to any one of the lines.

Further objects, features and advantages will be apparent upon consideration of the following description taken in conjunction with the drawings wherein:

Figs. 1 through 7, when arranged in accordance with Fig. 8, are a circuit representation of the line concentrator trunking system of the present invention wherein:

Figs. 2, 3 and 5 through 7 are a circuit representation of the central office;

Fig. 8 illustrates the arrangement of Figs. 1 through 7;

Fig. 9 is a table illustrating the slip multiple connections and the trunk preference for each multiple;

Figs. 10 and 11 are tables illustrating the connections of the armatures of relays 6VG0–11 which are shown in Fig. 6.

Referring to Figs. 1 through 7, when arranged in accordance with Fig. 8, the first digit of each reference number indicates the figure in the circuit drawings in which the relay, or component, appears, and the letters indicate the function thereof. Relay 2HG0, for example, is the horizontal group relay 0, and appears in Fig. 2.

Before proceeding with a description of the trunking system of the present invention, the line concentrator normal scanning sequence of operations is briefly described. The scanning system is described in detail in the copending application Serial No. 555,916, filed on even date herewith by Almquist-Joel-Posin. The scanning system is briefly described herein because it is utilized, as is hereinafter described, to mark the line-to-trunk crosspoints during the trunk selecting sequence of operations.

Normal scanning

Figure 1:
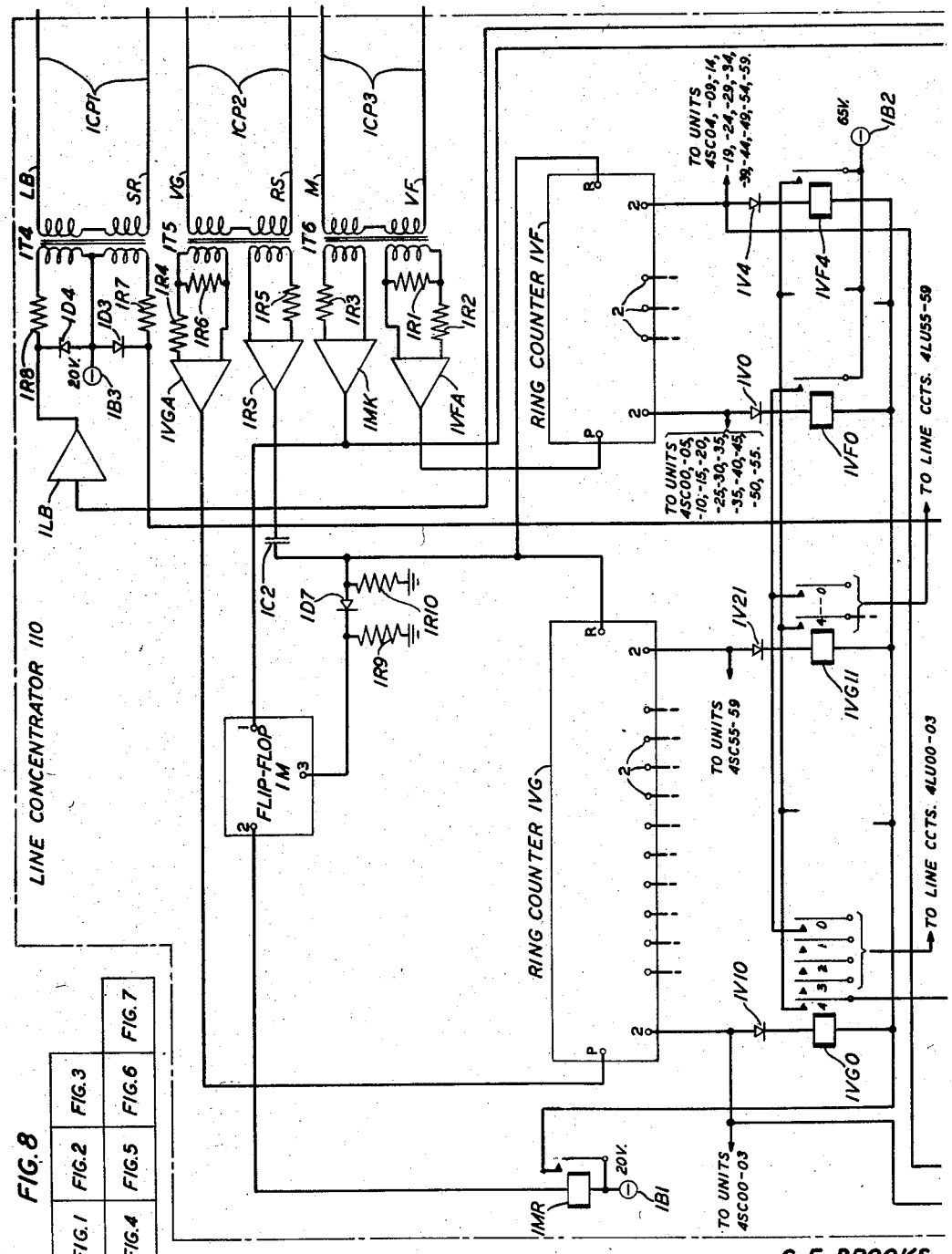
Figs. 1 and 4 are a circuit representation of the line concentrator.
Figure 2:
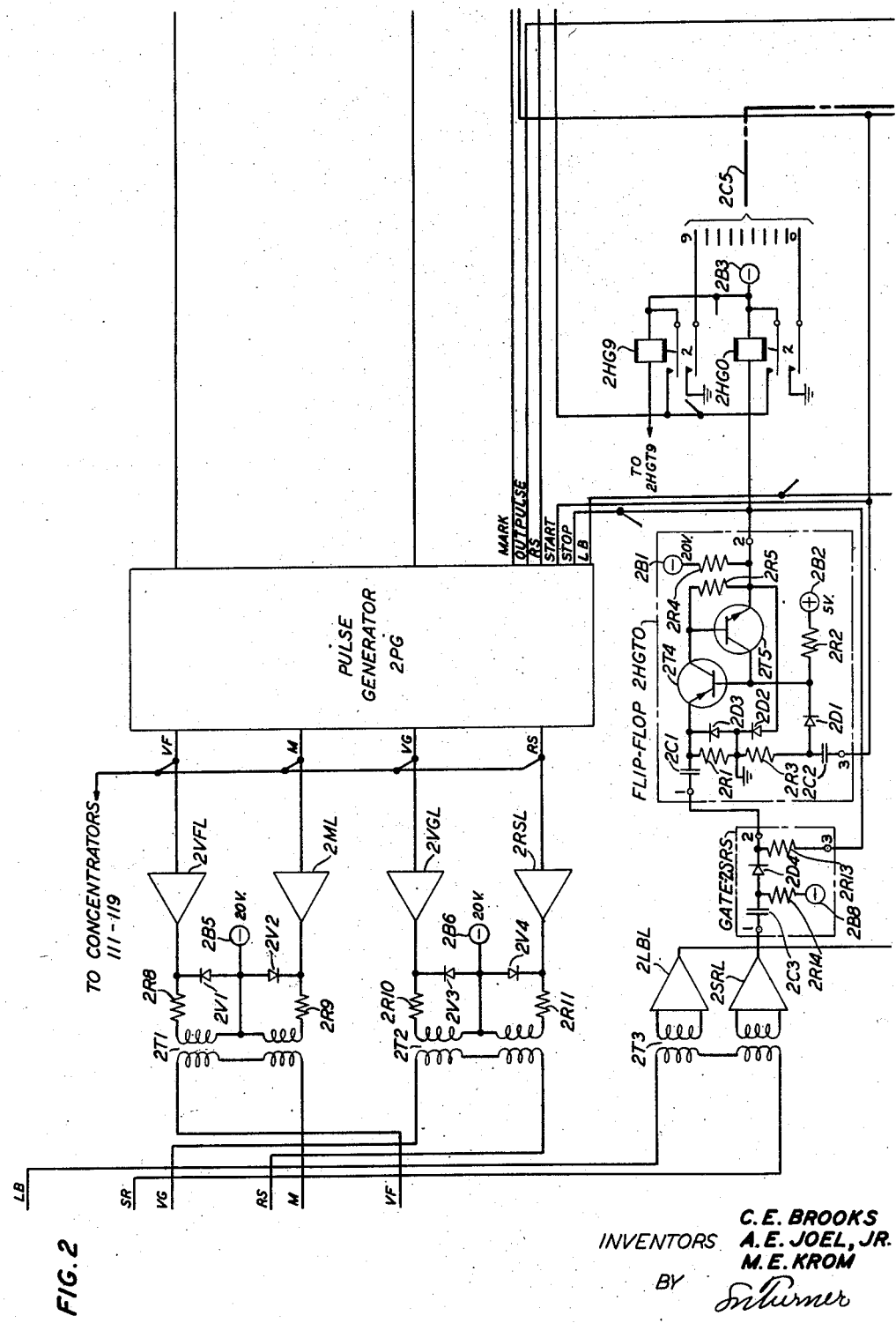
Figure 3:
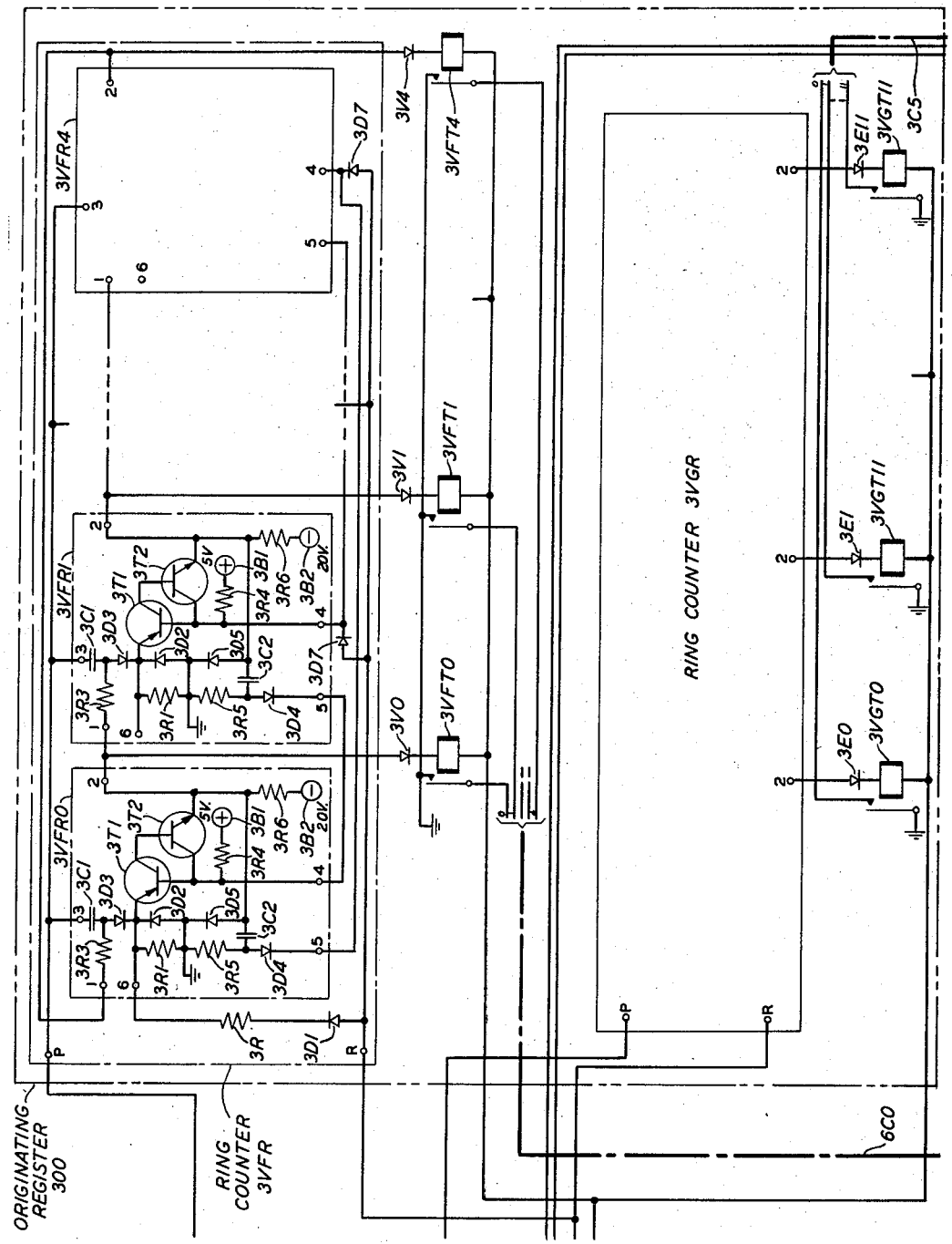
Figure 4:
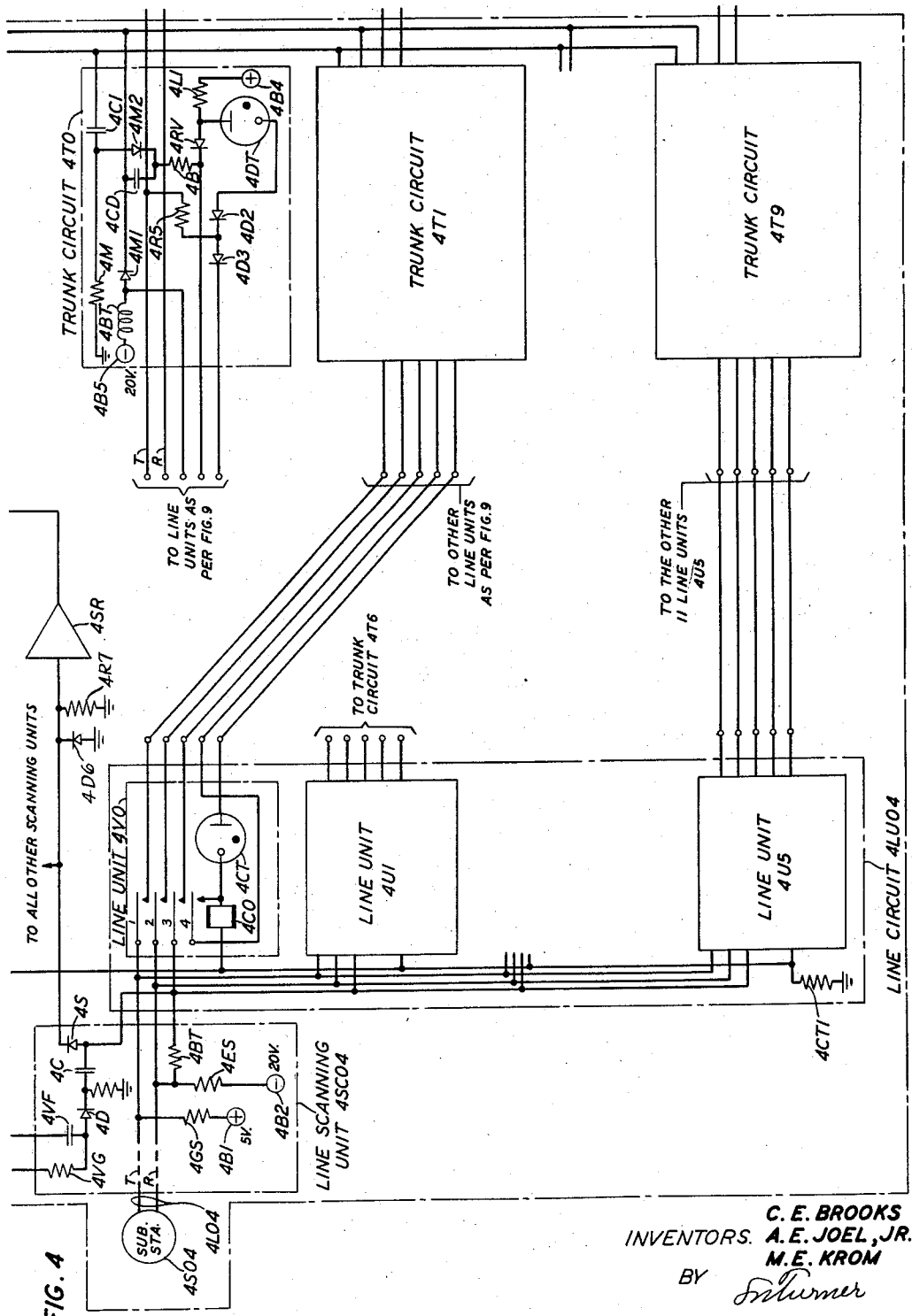
Figure 5:
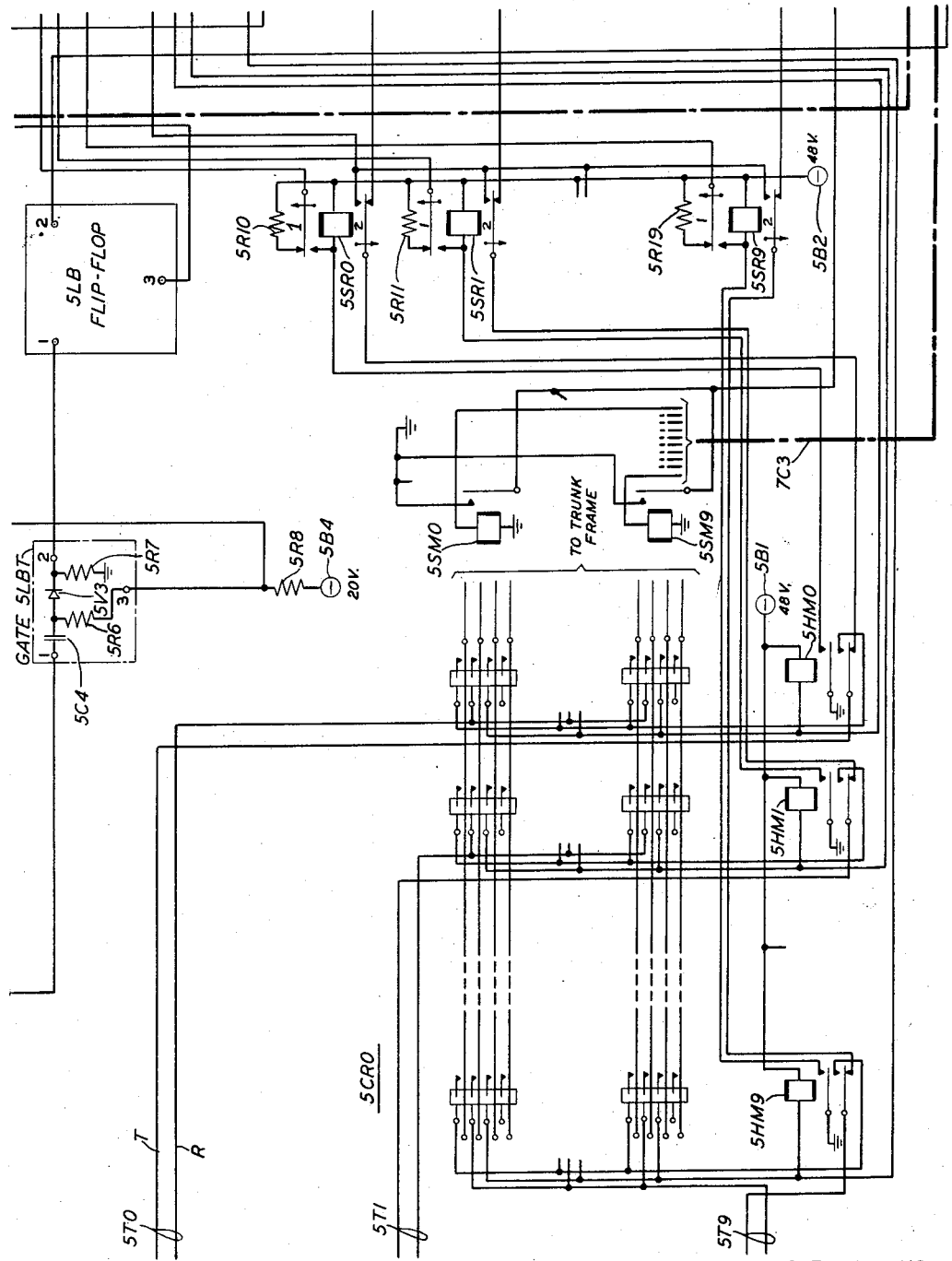

The line concentrator 110 shown in Figs. 1 and 4 is located at a remote location from the central office equipment shown in Figs. 2, 3 and 5 through 7. Ten line concentrators 110—19 are connected to the central office equipment, though only one, the line concentrator 110, is shown. The line concentrator 110 provides a connection from 60 subscriber substations 4S00–59 to the central office. Only the substation 4S04 is shown. The effect of utilizing the line concentrator 110 is to place a part of the switching equipment of the central office at a distance therefrom in order to conserve outside plant facilities. The line concentrator 110 is connected to the central office by ten trunks 5T0–9 and three control pairs 1CP1–3. The trunks 5T0–9 provide talking paths between the line concentrator 110 and the central office and the three control pairs 1CP1–3 provide for signaling paths to and from the central office equipment.

With 60 subscriber lines, such as line 4L04, connected to each of the ten line concentrators 110–19, there are a total of 600 subscriber lines which are served by the central office equipment. With all 600 subscriber lines idle, the central office continuously and synchronously scans the ten groups of 60 subscriber lines.

The ten line concentrators 110–19 are synchronously scanned under control of a scanner pulse generator 2PG, which is described in detail in the Joel-Krom-Posin Patent 2,812,385 issued on November 5, 1957. The scanner pulse generator 2PG simultaneously provides scanning pulses through the ten sets of three control pairs 1CP1–3 to the ten line concentrators 110–19. The scanner pulse generator 2PG also supplies the scanning pulses to a concentrator originating call register 300. The scanner pulse generator 2PG and the concentrator originating call register 300 are common control equipment for all ten concentrators 110–19. The ten line concentrators 110–19 and the register 300 are synchronously and cyclically operated under control of the scanning pulses from the generator 2PG.

Figure 12:
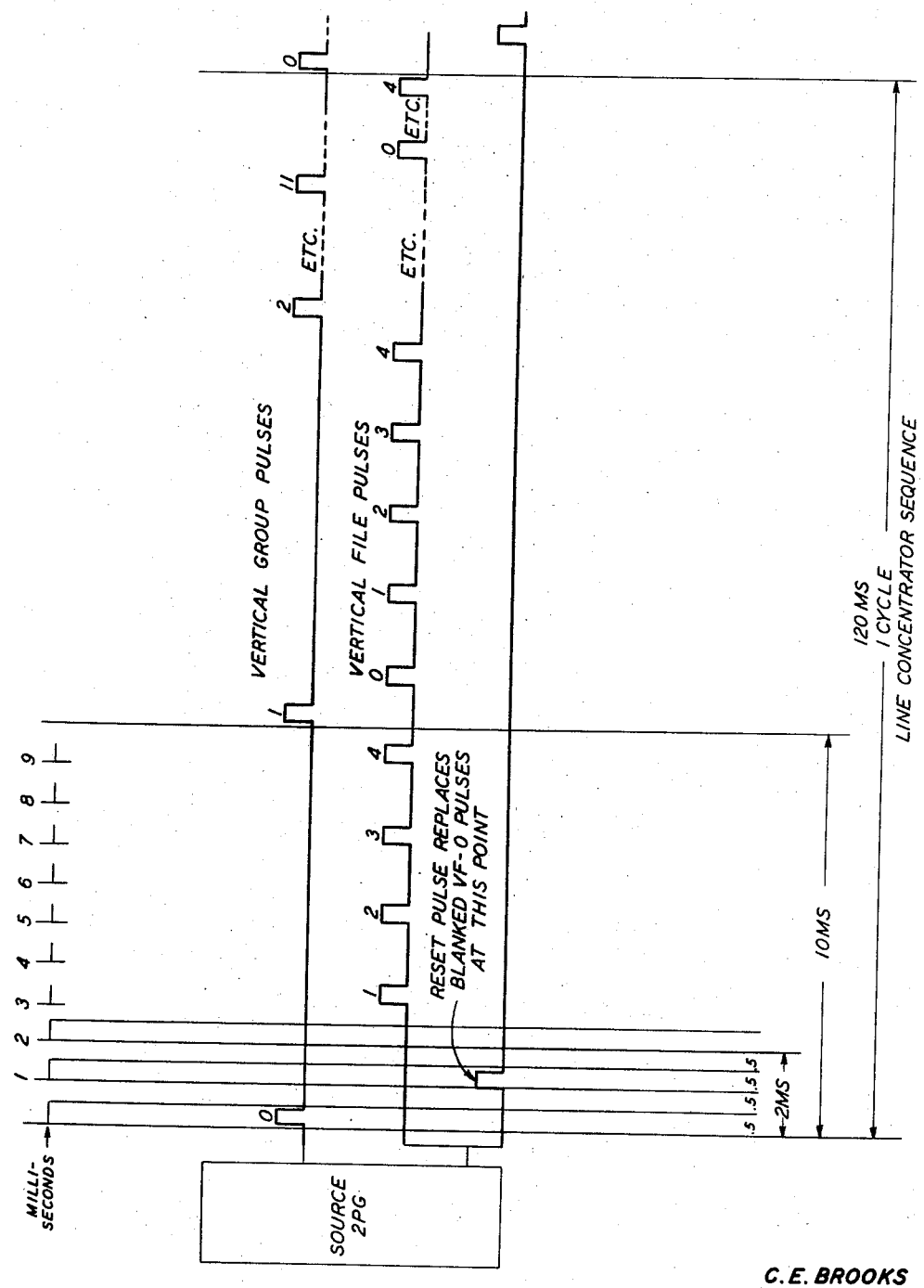
Fig. 12 is a series of pulse time curves illustrating the scanning sequence utilized in the present invention.

The scanner pulse generator 2PG supplies four types of pulses: vertical group pulses, vertical file pulses, reset pulses and mark pulses. As in the ordinary crossbar telephone system, the subscriber lines are arbitrarily arranged in vertical groups, vertical files and horizontal groups. Such crossbar systems are described, for example, in the Patent 2,585,904 which was granted to A. J. Busch, February 19, 1952. All the subscriber lines connected to one of the ten concentrators 110—19 are in the same horizontal group and they are subdivided into twelve vertical groups, each of which includes five vertical files. The vertical group pulses supplied by the scanner pulse generator 2PG select a group of five lines connected to each of the line concentrators 110—19. The vertical group pulse is supplied simultaneously to the ten line concentrators 110—19 so that five times ten, or 50, subscriber lines are selected. Between two such vertical group pulses, the scanner pulse generator 2PG supplies five vertical file pulses to the concentrators 110—19, as shown in Fig. 12 which illustrates the normal scanning pulse sequence. One subscriber line connected to each of the concentrators, or ten in all is scanned by each vertical file pulse. In order to scan the 600 lines, the scanner pulse generator 2PG provides to each of the ten line concentrators 110—19 and to the register 300, twelve 15-volt vertical group pulses spaced at intervals of 10 milliseconds and five 15-volt vertical file pulses spaced at intervals of 2 milliseconds between each pair of vertical group pulses. The vertical file and vertical group pulses are ½ millisecond pulses and the complete scanning cycle has a duration of 120 milliseconds.

In addition to the vertical group and the vertical file pulses, the generator 2PG supplies one reset pulse at the beginning of the cycle to ensure the synchronous operation of the line concentrator scanning cycles and the originating call register cycle with that of the generator 2PG. The reset pulse, as is hereinafter described, also functions as the first vertical file pulse so that only 59 vertical file pulses are provided instead of 60 for a single cycle.

To recapitulate, during one scanning cycle, the pulse generator 2PG supplies one reset pulse, twelve vertical group pulses and 59 vertical file pulses. One vertical file pulse is provided, if the reset pulse is included, for each of the 60 subscriber lines.

The scanner pulse generator 2PG also provides mark pulses which are utilized, as is hereinafter described, when a call to or from one of the 600 subscriber lines is being served.

The originating register 300 has two ring counters 3VFR and 3VGR. The counter 3VFR is a five-stage ring counter having stages 3VFR0–4 and the counter 3VGR is a twelve-stage ring counter. A ring counter may be referred to as a walking circuit or a sequence circuit which advances one step for each input pulse supplied thereto. The vertical file pulses from the generator 2PG are supplied through the counter input terminal P to the input terminal 3 of each of the five stages 3VFR0–4. A single counter stage, such as the stage 3VFR0, may be thought of as a combination of an enabling gate and flip-flop circuit. A stage is said to be gated when its gate is enabled and is said to be "on" when its flip-flop circuit is set. A stage may be turned on only if its gate is enabled to allow the input pulse through to set, or turn on, its flip-flop circuit. When a stage is turned on, the potential at its output terminal 2 changes from −20 volts to −2 volts to enable the gate of the succeeding stage.

Assume, for example, that at the beginning of the scanning cycle the stage 3VFR0 has its flip-flop circuit set. Only one of the stages 3VFR0–4 is set at a time, and the stage succeeding the set stage is the only gated or enabled stage. The input terminal 3, through which the positive pulse is supplied, is connected through the input coupling capacitor 3C1 and the varistor 3D3 to the emitter electrode of the transistor 3T1. The transistor 3T1 is one of two junction transistors 3T1 and 3T2, which are connected in a hook arrangement to function as a point contact transistor. Such arrangements are described, for example, in the Patent 2,655,609 which was granted to W. Shockley on October 13, 1953. The emitter electrode of transistor 3T1 is connected to ground through the resistor 3R1 and through the varistor 3D2. The resistor 3R1 functions as a load resistor for the input pulse and the varistor 3D2 provides a low resistance path for the emitter sustaining current, and also functions to dissipate any negative pulses to ground. The base of transistor 3T1 is connected to the collector of transistor 3T2, to the +5 volt direct-current potential source 3B1 through the base resistor 3R4 and through the reset terminal 4 to the terminal 5 of the succeeding stage 3VFR1. The emitter electrode of transistor 3T2 is connected to the output terminal 2 and to the −20 volt battery 3B2 through resistor 3R6.

With the first stage 3VFC0 on, the output terminal 2 thereof is at a potential of −2 volts due to the current through the resistor 3R6. With the −2 volt potential at terminal 2 of stage 3VFR0, the varistor 3D3 of stage 3VFR1 is relatively forward-biased, or only slightly back-biased. The terminal 2 of stage 3VFR0 is connected through the terminal 1 of stage 3VFR1 and resistor 3R3 to the varistor 3D3. With the varistor 3D3 in stage 3VFR1 relatively forward-biased, the stage 3VFR1 is enabled so that an input pulse through terminal 3 thereof causes it to turn on. If stage 3VFR0 is not on and its terminal 2 is at a potential of −20 volts, varistor 3D3 in stage 3VFR1 is reversed-biased so that an input pulse through its terminal 3 does not turn it on.

When the first pulse is supplied to the terminals 3 of stages 3VFR0–4 from the generator 2PG, it turns on the stage 3VFR1 through the enabled gate circuit, which includes the forward-biased varistor 3D3. The potential at terminal 2 of stage 3VFR1 changes from −20 volts to −2 volts to enable the stage 3VFR2 and reset the stage 3VFR0. The terminal 2 in stage 3VFC1 is connected through the capacitor 3C2 of stage 3VFR1, varistor 3D4 and terminal 5 to terminal 4 of stage 3VFR0. Terminal 4 is connected, as described above, to the base electrode of transistor 3T1. When terminal 2 of stage 3VFR1 changes in potential from −20 volts to −2 volts, the change in potential is provided to the base of transistor 3T1 in stage 3VFR0 causing the stage 3VFR0 to turn off. When the stage 3VFR0 is turned off, in this manner, the potential at its terminal 2 decreases from −2 volts to −20 volts disabling the gate circuit including the varistor 3D3 in the stage 3VFR1.

To briefly recapitulate, the first pulse supplied to terminals 1 of stages 3VFR0–4 turns on the stage 3VFR1 which enables the stage 3VFR2 and resets or turns off the stage 3VFR0. When the stage 3VFR0 is turned off, it disables the stage 3VFR1. After the first pulse, therefore, the stage 3VFR1 is turned on and the others are turned off, and the stage 3VFR2 is enabled and the others disabled.

The second pulse from the generator 2PG turns on the stage 3VFR2, which enables the stage 3VFR3, and turns off the stage 3VFR1. The stage 3VFR1, in turn, disables the stage 3VFR2. The pulses supplied to the terminals 3 of the stages 3VFR0–4 in this manner advance the setting from stage to stage with the sixth pulse being equivalent to pulse No. 1. The sixth pulse is equivalent to the first pulse because the stages 3VFR0–4 are connected in a ring with the output terminal 2 of stage 3VFR4 being connected to terminal 1 of stage 3VFR0 and the terminal 5 of stage 3VFR0 being connected to the reset terminal 4 of stage 3VFR4.

The above sequence continues from stage to stage in the counter 3VFR until the pulse generator 2PG is disabled. A similar sequence of events takes place in the counter 3VGR except that it takes twelve pulses to complete a cycle instead of five since the counter 3VGR has twelve stages.

At the beginning of each scanning cycle a positive reset pulse is supplied from the pulse generator 2PG to the register 300. The reset pulse is supplied, respectively, through the reset terminal R, and the serially connected varistor 3D1 and resistor 3R to the terminal 6 of stage 3VFR0 and to the reset terminal R of counter 3VGR. When a reset pulse is applied to terminal 6 of stage 3VFR0 it turns the stage on since terminal 6 is connected to the emitter electrode of transistor 3T1. Terminal R is also connected through the varistors 3D7 to the reset terminals 4 of the other stages in the counters 3VFR and 3VGR to reset or turn off these stages. At the beginning of each cycle, therefore, the pulse generator 2PG supplies a reset pulse to the counters 3VFR and 3VGR to return them to normal with only the first stage in each counter set. As shown in Fig. 12 the generator 2PG does not supply a vertical file pulse when the reset pulse is supplied. The reset pulse functions as the first vertical file pulse since it is supplied to the input terminal 6 of stage 3VFR0 and advances the vertical file counter 3VFR from stage 3VFR4 to stage 3VFR0. The generator 2PG therefore supplies twelve vertical group pulses, one reset pulse and 59, not 60, vertical file pulses to the register 300 during one scanning cycle.

The pulse generator 2PG supplies the vertical file, vertical group and reset pulses to the counters 3VFR and 3VGR in the register 300, as described above, and also through ten sets of the control leads 1CP1–3 to the concentrators 110–19.

The vertical file pulses are supplied through amplifier 2VFL and resistor 2R8 to the upper primary of transformer 2T1 which, in turn, is connected to −20 volt battery 2B5 and to the varistor 2V1. The secondary of transformer 2T1 is connected through the control pair 1CP3 to the concentrator 110. The vertical group pulses are supplied through the amplifier 2VGL, resistor 2R10 and the upper primary of transformer 2T2. The upper primary of transformer 2T2 is also connected to the −20 volt battery 2B6 and to varistor 2V3. The secondary of transformer 2T2 is connected through the control pair 1CP2 to the concentrator 110. The reset pulses are supplied through amplifier 2RSL, and resistor 2R11 to the lower primary of transformer 2T2 which is shunted by varistor 2V4.

During the normal scanning cycle, the scanner pulse generator 2PG continuously and cyclically provides the vertical group, vertical file and reset pulses to the line concentrator originating call register 300 and to the ten line concentrators 110—19. The concentrators 110—19 each includes a vertical group ring counter 1VG and a vertical file ring counter 1VF which are cyclically and synchronously operated with the ring counters 3VGR and 3VFR. The counters 1VG and 1VF are similar to the counters 3VGR and 3VFR. The vertical file, vertical group and reset pulses are supplied through the ten sets of three control pairs 1CP1–3 with each set of three control pairs 1CP1–3 being connected to one of the line concentrators 110–9. The line concentrator 110, shown in Figs. 1 and 4, is connected through one set of the control pairs 1CP1–3 to the transformers 2T1–3. The vertical group, vertical file and reset pulses, provided in this manner to each of the ten line concentrators 110–9, cyclically and synchronously operate the ring counters 1VG and 1VF in each of the ten concentrators 110–9.

At the line concentrator 110 the control pairs 1CP1–3 are connected, respectively, to the secondaries of the transformers 1T4–6. The lower primary of the transformer 1T6, which is shunted by the resistor 1R1, is connected through resistor 1R2 to the vertical file receiving amplifier 1VFA. The upper primary winding of the transformer 1T5, which is shunted by the resistor 1R6, is connected through resistor 1R4 to the vertical group receiving amplifier 1VGA. The lower primary winding of the transformer 1T5 is connected through the resistor 1R5 to the reset amplifier 1RS.

The amplified vertical file pulses are supplied from the amplifier 1VFA to the input terminal P of the five-stage vertical file ring counter 1VF. The amplified vertical group pulses are supplied from the amplifier 1VGA to the input terminal P of the vertical group ring counter 1VG. The amplified reset pulse from the amplifier 1RS is supplied through the capacitor 1C2 to the reset terminals R of the counters 1VF and 1VG. The capacitor 1C2 is connected to the grounded resistor 1R10 which provides a recharge path for the capacitor 1C2. The counters 1VF and 1VG are stepped, in the manner, by the vertical group and vertical file pulses in synchronism with the counters 3VFR and 3VGR under control of the generator 2PG.

Capacitor 1C2 is also connected through varistor 1D7 to the reset terminal 3 of the flip-flop circuit IM which is similar to the hereinafter described flip-flop circuit 2HGT0. Briefly, the circuit IM is a bistable device which is set when an input pulse is provided to terminal 1 and reset when a pulse is provided to terminal 3. Terminal 3 is connected to ground through resistor 1R9. The reset pulse insures that the flip-flop circuit IM is reset at the beginning of each scanning cycle.

As long as there are no service requests from any of the 60 subscriber lines 4L00–59, or a terminating call thereto, eleven sets of counters, one in the central office register 300 and one in each of the line concentrators 110–9, synchronously step through the count of 60, with a reset pulse being supplied at the beginning of each cycle to insure the synchronism of the sets of counters.

At each combination of operated counter stages in counters 1VG and 1VF a pulse is directed to scan one of the 60 lines 4L00–59 by the line scanning units 4SC00–50. Only line 4L04 and unit 4SC04 are shown in the line concentrator 110. Each of the line scanning units 4SC00–59 has two gating circuit components, one controlled by the counters 1VF and 1VG and the other controlled by the condition of the associated line. The first gating circuit component which includes the varistor 4D functions as an enabling or readying component for the scanning unit.

The ring counter 1VG functions to successively ready groups of five line scanner units at a time, by changing the reverse-bias across the varistor 4D from −20 volts to −2 volts. When the first stage in counter 1VG, for example, is set, a relatively positive potential is provided from the first output terminal 2 thereof through resistors 4VG of the five line scanner units 4SC00–4 to the respective varistors 4D. The five varistors 4D in the units 4SC00–4 become biased to allow the passage of pulses from the ring counter 1VF through capacitors 4VF. The varistors 4D in the other 55 units 4SC05–59 are reversed-biased by the −20 volt potential at terminals 2 of the other eleven stages of counter 1VG.

The ring counter 1VF provides scanning pulses successively to twelve line scanning units at a time. When the fourth or last stage, for example, is set, a positive pulse is provided from the terminal 2 thereof to the capacitors 4VF in the units 4SC04, 4SC09, 4SC14, 4SC19, 4SC24, 4SC29, 4SC34, 4SC39, 4SC44, 4SC49, 4SC54 and 4SC59. Of these, only the unit 4SC04, however, has been readied at this time by the ring counter 1VG. The positive pulse from terminal 2 of the last stage of counter 1VF, therefore, is connected through the capacitor 4VF of the unit 4SC04, varistor 4D and capacitor 4C to the varistor 4S. The varistor 4S is part of the second gating circuit component which is controlled by the line condition.

In the unit 4SC04 the line 4L04 has associated therewith a resistor 4GS, which is connected from the tip lead T to the +5 volt battery 4B1, and a resistor 4ES which is connected from the ring lead R to the −20 volt battery 4B2. If the subscriber line 4L04 is open, the −20 volt battery 4B2 functions to reverse-bias the varistor 4S so that the scanning pulse from the ring counter 1VF is not transmitted through the varistor 4S. When, however, the subscriber line 4L04 is in a calling condition with the line closed, a circuit is completed from battery 4B1 through resistor 4GS, substation 4S04, and resistor 4ES to battery 4B2. The potential at the junction between varistor 4S and capacitor 4C becomes sufficiently positive to allow the scanning pulse from the last stage of the ring counter 1VF to pass through the varistor 4S, amplifier 4SR, and resistor 1R7 to the lower primary of transformer 1T4. Negative potentials are suppressed by the varistor 4D6 which is paralleled by resistor 4R7.

The scanning units 4SC00–59, in this manner, allow the vertical file pulses to pass through as a service request pulse when both gating circuit components are enabled. The first component, which includes varistor 4D, is enabled by the counter 1VG, and the second component, which includes varistor 4S, is enabled when the associated line is closed. However, when the line 4L04 is connected to one of the trunks 5T0–9 and is therefore in a busy condition, the varistor 4S, as is hereinafter described, is reverse-biased.

If all the lines 4L00–59 remain idle the scanning sequence continues under control of the three sets of pulses, the vertical group, the vertical file and the reset pulses from the central office. Each vertical group pulse readies five line scanning units, and each vertical file pulse scans one of the five readied line scanning units. In this manner the five readied line scanning units are successively scanned by the five vertical file pulses which occur between two of the vertical group pulses. At the time position for the first vertical file pulse the vertical file pulse is actually omitted, as described above, and a reset pulse is transmitted from the central office to insure that the counters 1VG and 1VF are in the start position. The first stage however, when reset supplies a scanning pulse to the scanning unit 4SC00.

Service request

When a call is initiated at one of the substations 4S00–59, the vertical file pulse from the ring counter 1VF is transformed by the scranning units 4SC00–59 to a service request pulse and supplied through the amplifier 4SR to the lower primary winding of transformer 1T4. The lower primary winding of transformer 1T4 is shunted by the varistor 1D3, and connected to the −20 volt battery 1B3. The secondary of the transformer 1T4 is connected through the control pair 1CP1 to the transformer 2T3 in the central office. The lower primary winding of transformer 2T3 is connected through the receiving amplifier 2SRL and the gate 2SRS to the input terminal 1 of the flip-flop circuit 2HGT0.

The gate 2SRS is an inhibiting gate which normally allows pulses through from its terminal 1 to its terminal 2. The inhibiting gate 2SRS has three terminals 1–3, with terminal 1 being the input terminal, terminal 2 the output terminal and terminal 3 the control terminal. With −20 volts at its control terminal 3 the gate 2SRS functions to allow passage of pulses from its input terminal 1 through to its output terminal 2. The −20 volt potential at terminal 3 relatively forward-biases the varistor 2D4 which is connected thereto through the resistor 2R13. The varistor 2D4 is connected to the terminal 2 and through the capacitor 2C3 to terminal 1, and the junction between capacitor 2C3 and varistor 2D4 is connected through the resistor 2R14 to the −20 volt battery 2B8. The forward-biased varistor 2D4 allows the positive pulse from the amplifier 2SRL to appear across the resistor 2R13. In its inhibiting state the terminal 3 is at a potential of −2 volts and the varistor 2D4 is reversed-biased with a potential of approximately 18 volts. The presence of a positive 18-volt pulse across the input resistor 2R14 is insufficient to overcome the reverse-biasing of varistor 2D4 so that an output pulse does not appear across the resistor 2R13. Terminal 3 of the gate 2SRS is connected to the output terminal 2 of the flip-flop circuit 2HGT0 which provides, as is hereinafter described, the −20 volt normal potential and the −2 volt inhibiting potential.

The flip-flop circuit 2HGT0 is a bistable transistor trigger circuit having two transistors 2T4 and 2T5 connected in a hook arrangement. An electrical pulse applied to the input terminal 1 triggers the circuit from one state to the other and leaves it there until a reset pulse to its terminal 3 triggers it back again to its former state. The flip-flop circuit is normal or off when its output terminal 2 is at a potential of −20 volts and off-normal, or on, when it has received a positive pulse through its input, or set, terminal 1 to change the potential at its output terminal 2 to −2 volts. A positive pulse through the reset terminal 3 restores the potential at its output terminal 2 to −20 volts. The time consumed in changing the output potential from one value to another is approximately 2/10 of a microsecond.

When the flip-flop circuit 2HGT0 is in its off condition, a very small amount of current somewhat less than 10 microamperes is supplied from the +5 volt source 2B2 through resistor 2R2, transistor 2T4 and resistor 2R1 to ground. The transistor 2T4 represents almost all of the impedance in this circuit path. With a 5-volt potential across the transistor 2T4, its emitter is back-biased so that the transistors 2T4 and 2T5 are in their low current quiescent condition. There is also a small current between the source 2B2 and a −20 volt source 2B1. This path is from source 2B2 through resistor 2R2, the base-to-collector path through transistor 2T4, the base-to-emitter path or transistor 2T5 in parallel with the collector-to-emitter path of transistor 2T5, through resistor 2R4 to battery 2B1. The transistor 2T5 being in its off, or low current quiescent condition, most of the potential drop is across it so that terminal 2 is at a potential of −20 volts.

When a positive pulse is supplied to terminal 1 of sufficient magnitude to raise the potential of the emitter electrode of transistor 2T4 above that of its base electrode, the transistor 2T4 becomes conductive. The input terminal 1 is connected through the capacitor 2C1 to the emitter electrode of transistor 2T4 and to ground through the resistor 2R1 and also through the varistor 2D3. When the transistors 2T4 and 2T5 are turned on, there is a low resistance path from ground through the varistor 2D3, the emitter-to-collector path of transistor 2T4, the base-to-emitter path of transistor 2T5 and resistor 2R4 to battery 2B1. The increase in current through the resistor 2R4 causes an 18-volt drop across it to change the potential at terminal 2 to −2 volts. The voltage drop across the collector-to-emitter path of transistor 2T5 is very small so that the collector electrode thereof is effectively at the −2 volt potential. With the emitter electrode of transistor 2T5 effectively at ground potential, it is therefore 2 volts more positive than its base electrode. This condition holds the transistors 2T4 and 2T5 on to provide for the bistable operation. The circuit 2HGT0 includes a varistor 2D2 which is connected from the emitter electrode of transistor 2T5 to ground. The varistor 2D2 prevents the output terminal 2 from going positive or above ground potential.

The circuit 2HGT0 remains in this stable condition until a positive pulse is received through the reset terminal 3. The reset terminal 3 is connected through the capasitor 2C2 and varistor 2D1 to the base electrode of transistor 2T4. The junction between capacitor 2C2 and varistor 2D1 is connected to ground through the resistor 2R3. The positive pulse to the base electrode of transistor 2T4 makes it more positive than its emitter electrode and thereby turns off the flip-flop circuit 2HGT0.

The flip-flop circuit 2HGT0 is individually associated with the concentrator 110. The line concentrator system also includes nine other flip-flop circuits 2HKT1–9, not shown, which are individually associated with the nine concentrators 111—19.

When the flip-flop circuit 2HGT0 operates, it functions generally to stop the transmission of the scanning pulses to the concentrators 110—19, to close the gate 2SRS and to call in a marker 700. The marker 700 and the connectors 701 and 702 associated therewith are of the type described in the above-identified Busch patent. The change from −20 volts to −2 volts at the output terminal 2 of the flip-flop circuit 2HGT0 functions as a stop potential to the generator 2PG, causes the inhibiting gate 2SRS to close and causes the operation of the relay 2HG0.

When the pulse generator 2PG stops, the ring counters 3VFR and 3VGR remain set at the calling line identity. For a service request from line 4L04, for example, the counter 3VFR has stage 3VFR4 turned on and the counter 3VGR has the first stage turned on.

When gate 2SRS is closed, the central office becomes insensitive to service requests, and remains in this condition until circuit 2HGT0 is reset.

Terminal 2 of circuit 2HGT0 is connected to the winding of relay 2HG0 which is also connected to battery 2B3. When relay 2HG0 operates, it connects the −20 volt battery 2B3 through its operated armature 1 to one side of the windings of relays 3VFT0–4 and 3VGT0–11. The windings of relays 3VFT0–4 are connected, respectively, through the varistors 3V0–4 to the output terminals 2 of the counter stages 3VFR0–4, and the windings of the relays 3VGT0–11 are connected, respectively, through the varistors 3E0–11 to the output terminals 2 of the twelve stages in counter 3VGR. With the counters 3VFR and 3VGR stopped on the line location of the calling subscriber, a −2 volt potential is on the other side of one of the relays 3VFT0–4, and one of the relays 3VGT0–11, causing them to operate. With a service request from line 4L04, relays 3VFT4 and 3VGT0 are operated.

When relay 2HG0 operates it also provides an indication of the identity of the line concentrator requesting service. The line concentrator identity is, as described above, the horizontal group indication. The horizontal group indication for concentrator 110 is zero. Relay 2HG0 operates and connects ground through its operated armature 2 and cable 2C5 to the line link marker connector 702. When relay 3VFT4 operates, it readies a path for supplying the vertical file information to the marker 700. When one of the relays 3VGT0–11 operates, it provides an indication of the vertical group identity to the marker connector 702. More specifically, when relay 3VGT0 operates, it connects ground through cable 3C5 to the marker connector 702. The vertical group identity indication also functions as a start signal for the marker 700 through the connector 702.

When the marker 700 receives the start signal from the connector 702, it seizes the line link connector 701. The line link connector 701 initiates an outpulsing operation and a trunk selection operation in order to establish a connection from the calling line 4L04 to a selected one of the trunks 5T0–9.

When the line link connector 701 is seized by the marker 700, it operates one of the horizontal group relays 6H0–9, the dial-tone relay 7D, and one of the vertical group relays 6VG0–11. In the example described above, when a call is initiated at line 4L04 and concentrator 110, the relays 6H0, 7D and 6VG0 are operated.

When the call is a terminating or call-back call instead of an originating call, a similar sequence occurs for the selection of a trunk except that a terminating or call-back relay, not shown, is operated instead of relay 7D.

When relay 6H0 is operated, it connects ground from the operated armature of relay 3VFT4, through cable 6C0, the operated armature F4 of relay 6H0 and cable 6C1 to the line link connector 701. In this manner when relay 6H0 is operated, it supplies the vertical file information through the connector 701 to marker 700. After the marker 700 receives the vertical file information, it operates the corresponding one of the relays 7VF0–4, or relay 7VF4. When relay 7VF4 is operated, ground is connected through the operated armature 2 of relay 7D, the operated armature 1 of relay 7VF4, the operated armature 13 of relay 6VG0, the operated armature 22 of relay 6H0 to the outpulse terminal of the pulse generator 2PG.

When the outpulse terminal is grounded upon the operation of relay 7VF4, the generator 2PG supplies a reset pulse and the correct number of vertical file and vertical group pulses to set the ring counters 1VG and 1VF at the identity of the calling line. Before sending the last vertical file pulse, the generator 2PG opens the gate 5LBT to permit a line busy test. The control terminal 3 of the gate 5LBT is connected to battery 5B4 through the resistor 5R8. The battery 5B4 normally provides a −20 volt inhibiting potential to the gate 5LBT. When the enabling connection is provided to the control terminal 3 by generator 2PG, the gate 5LBT is opened and the central office becomes receptive to line busy pulses from the concentrator 110.

The gate 5LBT is a three-terminal device with an input terminal 1, an output terminal 2 and a control terminal 3. Normally with −20 volts at terminal 3 the gate 5LBT functions to prevent the passage of pulses from terminal 1 to terminal 2. Terminal 3 is connected to the varistor 5V3 through resistor 5R6 and varistor 5V3 is connected to terminal 1 through capacitor 5C4 and also to terminal 2. Terminal 2 is connected to ground through resistor 5R7. With −20 volts at terminal 3, varistor 5V3 is reverse-biased. When ground is connected to terminal 3, varistor 5V3 becomes sufficiently forward-biased to allow the passage of line busy pulses from the concentrator 110.

Figure 6:
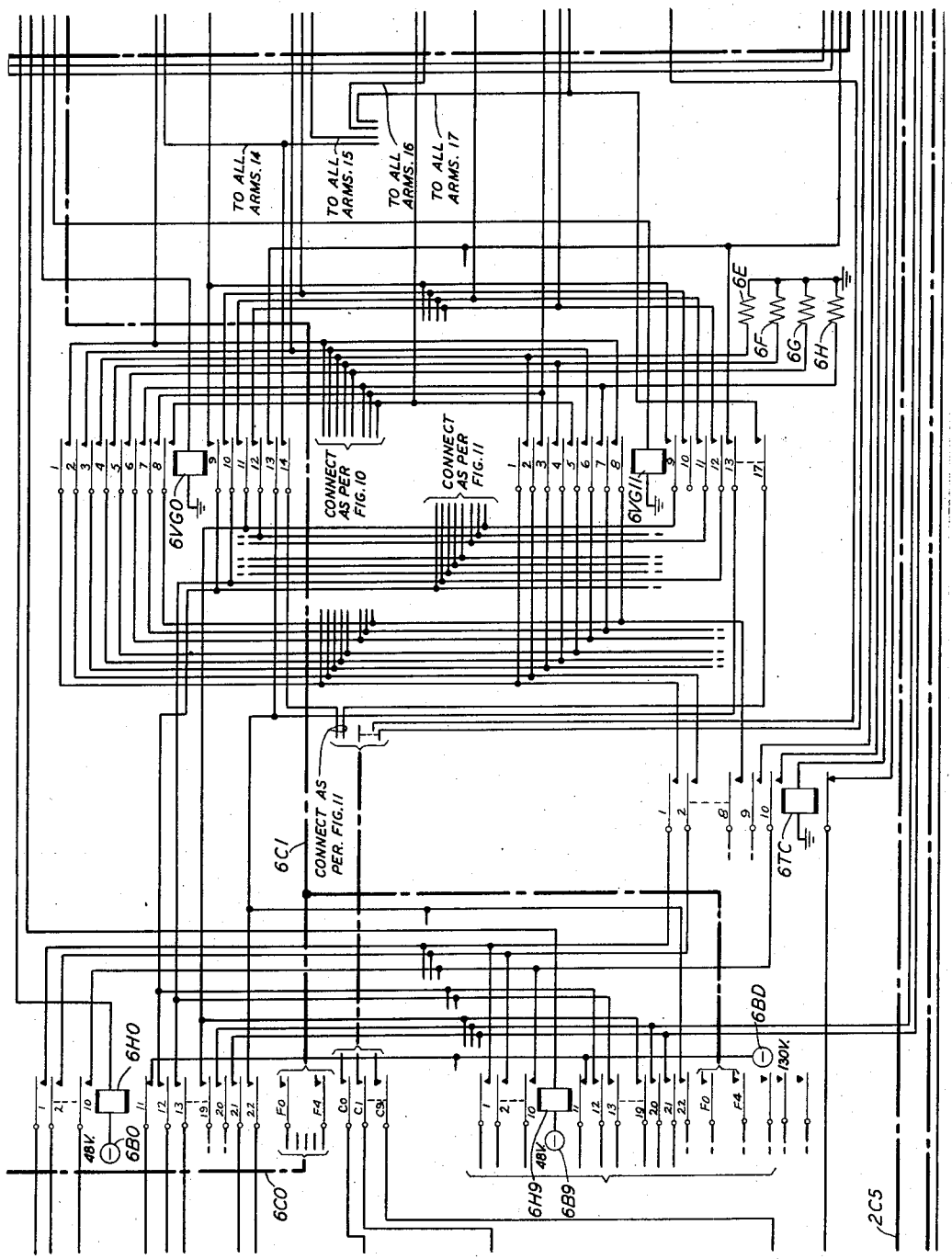

When relay 7D is operated, it, in turn, causes the operation of the trunk connect relay 6TC. The operating path for relay 6TC is from battery 7B2 through the operated armature 1 of relay 7D and the serially connected normal armatures 1 of the six trunk selecting relays 7TS0–5 to the grounded winding of relay 6TC. When relay 6TC operates, it generally causes the operation of all six preference relays 7TS0–5. The windings of relays 7TS4 and 7TS5 are connected directly to the armatures 9 and 10 of relay 6TC, and the windings of relays 7TS0–3 are connected, respectively, through the operated armatures 1, 2, 8 and 7 of relay 6VG0 to armatures 1, 2, 8 and 7 of relay 6TC. When relay 6TC operates, it extends, respectively, the paths from the windings of relays 7TS0–5 through the operated armatures 1, 2, 8, 7, 9 and 10 of relay 6H0, the normal armatures 1 of relays 5SR0, 5SR1, 5SR7, 5SR6, 5SR8 and 5SR9, and resistors 5R10, 5R11, 5R17, 5R16, 5R18 and 5R19 to battery 5B2. The windings of the six relays 7TS0–5 are in this manner, respectively connected through the normal armatures 1 of six of the slow release relays 5SR0–9. The windings of relays 7TS4 and 7TS5 are always connected through the normal armatures 1 of relays 5SR8 and 5SR9, and the windings of the other four relays 7TS0–3 are connected through armatures 1 of four of the relays 5SR0–7. The operation of the vertical group relays 6VG0–11 determines which four of the relays 5SR0–7 are to be utilized. As indicated in Fig. 6, Figs. 10 and 11 illustrate the connections to the armatures of relays 6 VG0–10. Fig. 10, for example, illustrates that the winding of relay 7TS0 is connected to armature 1 of relay 6VG0.

There are ten sets of slow release relays 5SR0–9. The sets of relays 5SR0–9 are individually associated with ten crossbar switches 5CR0–9, of which, only switch 5CR0 is shown. The operation of the relays 6H0–9 determines which one of the crossbar switches 5CR0–9 is to be utilized to serve the call. The relays 5SR0–9 are normal when the associated trunks 5T0–9 are idle because trunks 5T0–9 are connected to the verticals of the switch 5CR0. If trunk 5T0, for example, is busy the hold magnet 5HM0 is operated, and a path is completed through the operated armature 1 of magnet 5HM0 for the relay 5SR0. With the relay 5SR0 operated, the operating path for the trunk selecting relay 7TS0 through its armature 1 is not completed. In this manner the trunk selecting relays 7TS0–5 are operated, upon the operation of relay 6TC, only if the associated ones of the trunks 5T0–9 are idle. With all trunks 5T0–9 idle, as described above, all six trunk selecting relays 7TS0–5 are operated.

There are ten relays 5SR0–9 that are utilized and only six relays 7TS0–5. The armatures 1 of relays 5SR0–9 that are not connected to the windings of one of the relays 7TS0–5, are connected to one of the four resistors 6E through 6H. The resistors 6E–H terminate the connections from the four non-used armatures 1 of relays 5SR0–9. Fig. 10 illustrates the connections of resistors 6E–H to the armatures of relays 6VG0–11, and Fig. 11 illustrates the connections from the armatures of relays 6VG0–11 to the armatures of relays 6H0–9. The resistors 6E–4 function as locking paths for the four non-used ones of relays 5SR0–9. The paths through the windings of relays 7TS0–5 function as locking paths for the other six of relays 5SR0–9. The locking paths are utilized during the trunk selection operation to prevent the release of any operated ones of relays 5SR0–9 until the trunk selection operation is completed. When one of the hold magnets 5HM0–9 is released, the associated one of relays 5SR0–9, therefore, remains operated during the trunk selecting operation.

As described above, the windings of relays 7TS0–5 are connected through armatures of six of the ten relays 5SR0–9, which are associated individually with the trunks 5T0–9. The six associated ones of the ten trunks 5T0–9 are referred to as being in the same multiple. At the line concentrator 110, the calling line 4L04 is connectable to any one of the six trunks in the multiple but not to the other four. Fig. 9 illustrates the possible connections from line to trunk. For the line 4L04, for example, a connection may be established to any one of trunks 5T1, 5T6, 5T0, 5T7, 5T8 and 5T9. A connection cannot be established from line 4L04 to any one of trunks 5T2, 5T3, 5T4 and 5T5.

If all six trunks of the multiple are idle, all six relays 7TS0–5 are operated. The relays 6VG0–11 effectively determine the multiple at the central office just as the line circuit connections do, as is hereinafter described, at the concentrator 110. It is necessary, of course, for the multiple at each end to be the same.

When any one of the relays 7TS0–5 operates, it opens the operating path through its normal armature 1 for the relay 6TC, causing it to release. When the relay 6TC releases, it, in turn, releases all except one of the relays 7TS0–5. The operated one of the relays 7TS0–5, which has the lowest designation, remains operated and the others release. When all six relays 7TS0–5 are operated, the release of relay 6TC, in turn, releases the relays 7TS1–5, with the relay 7TS0 remaining operated. The relay 7TS0 is locked to battery 7B2 through its operated armature 1 and the operated armature 1 of relay 7D. In this manner when relay 6TC releases, only one of the six trunk selecting relays 7TS0–5 remains operated.

The relays 7TS0–5 provide for the preference selection of the six trunks connectable to the calling line. When relay 7TS0 is operated, it indicates that the preferred trunk connectable to the calling line is idle and that a connection is to be established thereto. When the call is initiated at the subscriber line 4L04, the preferred trunk is 5T0 as shown in Fig. 9. In the preference column in Fig. 9, the preference of trunks is from left to right. For line 4L04 the trunk preference line is 0, 1, 7, 6, 8, 9.

During the trunk selecting sequence of operations, the marker 700 selects an idle connection to a horizontal of the crossbar switch 5CR0. The utilization of the switches 5CR0–9 allows for the trunk multiple connections where less than all the trunks 5T0–9 are connectable to each subscriber line. If trunk multiples were utilized, and the trunks 5T0–9 connected directly to the horizontals instead of the verticals of switches 5CR0–9, the marker 700 may select a horizontal that is not connectable to the calling line. The switches 5CR0–9 allow for the connection of each horizontal to any one of the trunks, so that independent of the selected horizontal, the preferred idle trunk, in the trunk multiple connected to the calling line, is utilized.

If the tenth, or bottom, horizontal of switch 5CR0 is selected, the line link connector 701 provides an operating potential through the cable 7C3 to the winding of the select magnet 5SM9 causing it to operate. With only one of the trunk selecting relays 7TS0–5 operated, when the select magnet 5SM9 is operated, an operating path is provided for the test check relay 7TSK. The operating path for relay 7TSK is from ground through the operated armature of the select magnet 5SM9, the normal armature 11 of relay 6TC, the operated armature 2 of relay 7TS0, the serially connected normal armatures 3 of relays 7TS1–5 and the winding of relay 7TSK to battery 7B3. Relay 7TSK, in this manner, operates only after the completion of the selection of the preferred idle one of trunks 5T0–9 by the relays 7TS0–5, and upon the operation of one of the select magnets 5SM0–9.

When relay 7TSK operates, it causes the pulse generator 2PG to supply mark pulses to the concentrator 110 and it provides a connect potential to the tip of the selected trunk 5T0.

When relay 7TSK operates, it connects ground through its operated armature 6 to the mark terminal of the pulse generator 2PG. When the pulse generator 2PG receives the mark ground potential, due to the operation of the relay 7TSK, it initiates a marking operation for readying the six trunks in the multiple connected to the calling line 4L04. A series of mark pulses are supplied from generator 2PG through amplifier 2ML and resistor 2R9 to the lower primary of transformer 2T1. The lower primary of transformer 2T1 is connected to battery 2B5 and to varistor 2V2. The secondary of transformer 2T1 is connected through the control pair 1CP3 to transformer 1T6 in the concentrator 110. The upper primary of transformer 1T6 is connected through resistor 1R3 to the amplifier 1MK. The output of amplifier 1MK is connected to the input terminal 1 of the flip-flop circuit 1M, which is similar to the circuit 2HGT0 described above. When the circuit 1M is set, it operates relay 1MR, the winding of which is connected to battery 1B1. When relay 1MR operates, it connects battery 1B1 through its operated armature to the windings of relays 1VF0–4 and 1VG0–11. The windings of relays 1VF0–4 are connected, respectively, through varistors 1V0–4 to the output terminals 2 of the stages in counter 1VF. The windings of relays 1VG0–11 are connected, respectively, through varistors 1V10–21 to the output terminals 2 of the stages in counter 1VG. Since, as described above, the pulse source 2PG outpulsed, or supplied, to the concentrator 110 a number of vertical group and vertical file pulses which indicate the identity of the calling line, the counters 1VF and 1VG are set in accordance therewith. When the calling line is line 4L04, the last stage in counter 1VF and the first stage in counter 1VG are set. When a stage is set a −2 volt potential is at the associated terminal 2. With the first stage in counter 1VG and the last stage in counter 1VF set, when relay 1MR operates, it causes the operation of relays 1VG0 and 1VF4.

With one of the relays 1VF0–4 operated, and one of the relays 1VG0–11 operated, a −65 volt source 1B2 is connected to one of the 60 line circuits 4LU00–59.

There is one line circuit for each of the subscriber lines 4L00–59, but only the circuit 4LU04 is shown. With the counters 1VF and 1VG set at the identity of the calling line, the mark pulses are effective to select the line circuit which is individual to the calling line. Each of the line circuits 4LU00–59 has six crosspoints, or line units, 4U0–5 which are connected to the associated subscriber line. The sixty sets of line units 4U–5 provide for connections between the sixty lines 4L00–59 and the ten trunks 5T0–9. With only six lines units for each line, each line is connectable to only six of the ten trunks 5T0–9. Fig. 9 illustrates the connections from the line units 4U0–5, in each of the circuits 4LU00–59, to the trunk circuits 4T0–9 which are individually associated with the trunks 5T0–9. As shown in Fig. 9 the subscriber lines which are in the same vertical group, are connectable to the same six trunks. For example, the five lines 4L00–4, which are in the vertical group 0, are connectable to the trunks 5T0, 5T6, 5T7, 5T8 and 5T9. As described above, the trunks which are utilized for a vertical group are referred to as a multiple. All twelve multiples are different in order to distribute the load carried by any one trunk. Such a distribution system of multiples is referred to as a slip multiple. The lines 4L00–59 are connectable to the trunks 5T0–9 on a slip multiple basis.

As shown in line unit 4U0, each of the line units 4U0–5 includes a serially connected relay 4C0 and gas tube 4CT. When the relay 4C0 is operated, a connection is provided from the associated line to one of the trunks 5T0–9. When the relays 1VF4 and 1VG0 are operated, as described above, the −65 volt battery 1B2 is connected to the line circuit 4LU04. The battery 1B2 is connected through the operated armature of relay 1VF4, and the operated armature 4 of relay 1VG0 to the windings of the six relays 4C0 in the circuit 4LU04. The anode of the gas tube 4CT in each the units 4U0–5 is connected to one of the trunk circuits 4T0–9. The connection from the anode of a tube 4CT is through a varistor 4D3, and resistor 4R5 to the tip of the associated one of trunks 5T0–9. For example, as indicated in Fig. 9, the gas tube 4CT, shown in the line unit 4U0 of circuit 4LU04, is connected through the circuit 4T1 to the trunk 5T1. The tube 4CT does not ionize and the associated relay 4C0 does not operate until a positive connect potential is provided on the tip of the trunk 5T1 connected thereto.

When relay 7TSK is operated it provides, as briefly mentioned above, a connect potential to the tip lead of the selected trunk. More specifically, when relay 7TSK operates, a connection is provided from the +100 volt battery 7B7 through the normal armature 2 of relay 7LB, the operated armature 7 of relay 7TSK, the operated armature 4 of relay 7TS0, the operated armature 14 of relay 6VG0, the operated armature C0 of relay 6H0, the normal armature 2 of the relay 5SR0 and the normal armature 2 of the hold magnet 5HM0 to the tip lead of the trunk 5T0. The trunk 5T0 is connected by the trunk circuit 4T0 to the line unit 4U2 in circuit 4LU04. The tip lead to trunk 5T0 is connected through resistor 4R5 and varistor 4D3 to the anode of tube 4CT of unit 4U2 in circuit 4LU04. The connect potential is also provided from circuit 4T0 to line units in some of the other circuits 4LU00–3, 4LU05–09, 4LU25–29, 4LU35–44 and 4LU50–54. The other circuits, however, have not been marked, or connected, to the −65 volt battery 1B2. The combination of the −65 volts at the cathode of the tube 4CT and the +100 volts at the anode of the tube 4CT in unit 4U2 of circuit 4LU04, causes the ionization of the tube 4CT. When the tube 4CT ionizes, relay 4C0 operates to establish a connection through the crosspoint 4U2 from the calling line 4L04 to the selected trunk 5T0.

When the crosspoint 4U2 of circuit 4LU04 is closed, the mark pulses, which are still being supplied from generator 2PG, are returned as line busy pulses through the control pairs 1CP1–3 to the central office.

When relay 4C0 operates, it forward-biases a diode 4M2 in circuit 4T0 to allow for the passage of the mark pulses. The diode 4M2 is normally reversed-biased by the battery 4B4, which is connected thereto through the resistor 4L1, varistor 4RV and resistor 4B. The other terminal of varistor 4M2 is connected to ground through the resistor 4M, and to the output of the amplifier 1MK through the capacitor 4C1. When relay 4C0 operates, it extends the connection from the −65 volt battery 1B2 through the operated armature 4 of relay 4C0, varistor 4RV and resistor 4L1 to the battery 4B4 locking relay 4C0 operated. The current through resistor 4L1 causes the potential at varistor 4M2 to decrease to allow the passage of mark pulses. With the varistor 4M2 forward-biased, the succeeding marking pulses from the central office are supplied through the amplifier 1MK, the capacitor 4C1, varistor 4M2 and capacitor 4CD to the line busy amplifier 1LB. In this manner the succeeding marking pulses are routed back to the central office through the amplifier 1LB as line busy pulses to indicate that the crosspoint relay 4C0 has operated. Battery 4B5 in circuit 4T0 is connected through the inductor 4BT and the operated armature 3 of relay 4C0 in unit 4U2 to reverse-bias the varistor 4D. When scanning is resumed, the line 4L04 does not initiate a service request when it is connected to one of the trunks 5T0–9. The scanning pulse from counter 1VF is then directed through capacitor 4VF, varistor 4D, capacitor 4C, the operated armature 3 of relay 4C0, and varistor 4M1 to the amplifier 1LB.

At the central office, the converted mark pulses are provided through the amplifier 2LBL, the open gate 5LBT to the input terminal 1 of the flip-flop circuit 5LB. When the flip-flop circuit 5LB is set, it causes the operation of the line busy relay 7LB, which provides the crosspoint closure indication to the marker 700 by completing a path to the hold magnet 5HM0, and it removes the +100 volt potential from the tip lead of trunk 5T0. When the marker 700 receives the crosspoint closure indication, it supplies a ground potential to one of the line hold leads LH. The line hold leads are multipled through the operated armatures 2 of the relays 7VF0–4. In the illustrative example, with line 4L04 initiating the service request, the ground potential is provided through the operated armature 2 of the relay 7VF4, the operated armature 1 of relay 7LB, the operated armature 3 of relay 7TS0, the operated armature 9 of relay 6VG0, the operated armature 12 of relay 6H0 to the winding of the hold magnet 5HM0 which is connected to the battery 5B1. When the hold magnet 5HM0 operates, it closes a connection between the trunk 5T0 and the bottom, or tenth, horizontal of the crossbar switch 5CR0. When the hold magnet 5HM0 operates, it also opens the path to the +100 volt volt connect potential, through its normal armature 2 from the tip ring of the trunk 5T0, and closes the operating path for relay 5SR0. The +100 volt path is already open at armature 2 of relay 7LB. Relay 5SR0, which operates as a memory that trunk 5T0 is in use is released when the call is terminated.

The operating path for the hold magnet 5HM0, as described above, is from armature 1 of relay 7LB through armature 3 of relay 7TS0. When the operated trunk selection relay is not relay 7TS0, the operating path for magnet 5HM0 also includes an armature of relay 7TSK. The operation of relay 7TSK indicates that only one of the relays 7TS0-5 is operated.

When the marker 700 has operated the hold magnet 5HM0 and completed a connection from the calling line 4L04 through trunk 5T0 and switch 5CR0 to an originating call register, not shown, it initiates the release of the connector 701. When the connector 701 releases it in turn allows the relays 6H0, 6VG0, 7D and 7VF4 to release. When relays 6H0 and 6VG0 release, they in turn cause the release of relay 7TS0. When the relay 7TS0 releases it in turn causes the release of the relay 7TSK. When relay 7TSK releases it closes the gate 5LBT, resets the flip-flop circuit 5LB and restarts the generator 2PG. The battery 7B6 is connected, upon the release of relay 7TSK, to reset the flip-flop circuit 5LB, to reset the flip-flop circuit 2HGT0, and to restart the normal scanning of the pulse generator 2PG. Relay 7LB is released when circuit 5LB is reset, and relay 2HG0 is released when circuit 2HGT0 is reset. When relay 2HG0 releases, it in turn releases relay 3VFT4 and 3VGT0.

When the source 2PG is restarted it first supplies a reset pulse to the line concentrator and to register 300. The amplifier 1RS, which receives the reset pulse in the concentrator 110, is connected, as described above, to the circuit 1M. The reset pulse is supplied through the amplifier 1RS, the capacitor 1C2 and varistor 1D7 to the reset terminal 3 of the flip-flop circuit 1M, causing it to reset. When circuit 1M resets, it releases relay 1MR, which, in turn, releases relays 1VF4 and 1VG0. Relay 4C0, however, remains operated due to the locking path through its operated armature 4. The locking path is from battery 4B4, through resistor 4L1, varistor 4RV, the operated armature 4 of relay 4C0, the winding of relay 4C0, and resistor 4CT1 to ground.

As described above, when the hold magnet 5HM0 is operated, the +100 volt connect potential is removed from the tip lead of the selected trunk 5T0. With the connect potential removed, tube 4CT extinguishes but relay 4C0 remains operated over the locking path to battery 4B4.

The normal scanning cycle continues until another service request is made by one of the lines 4L00-59, or a call is made thereto. When the subscriber at substation 4S04 hangs up, the opening of line 4L04 is detected at the central office and the magnet 5HM0 is released. When the magnet 5HM0 releases, a −130 volt disconnect potential is applied to the tip lead of the trunk 5T0. The disconnect potential is provided from battery 6BD through the normal armature 11 of relay 6H0, the operated armature 2 of slow release relay 5SR0, the normal armature 2 of relay magnet 5HM0, the tip lead of trunk 5T0, resistor 4R5, and varistor 4D2 to the cathode of tube 4DT. The anode of tube 4DT is connected through resistor 4L1 to battery 4B4 so that tube 4DT ionizes. When tube 4DT ionizes, its anode potential becomes more negative, and reverse-biases the varistor 4RV to open the locking path for relay 4C0. When relay 4C4 releases, it disconnects line 4L04 from trunk 5T0. During the disconnect sequence the normal scanning cycle is continued.

It is to be understood that the above-described arrangements are illustrative of the application of the principles of this invention. Numerous other arrangements may be devised by those skilled in the art without departing from the spirit and scope of the invention.

What is claimed is:

1. In a telephone system, a central office, a group of subscriber lines, a crosspoint network providing a plurality of connections to each of said subscriber lines and located at a distance from said central office, a plurality of trunks less in number than said plurality of lines but more in number than said plurality of connections to each of said lines and extending from said network to said central office, means associated with said network responsive to the initiation of a call on one of said lines for supplying an identification of said line to said central office, means in said central office controlled by said supplying means for determining which of said plurality of trunks are connectable to said calling line, means controlled by said determining means for selecting an idle one of said trunks connectable to said calling line, and means controlled by said selecting means for operating said crosspoint network to connect said calling line to said selected trunk.

2. In a trunking system for line concentrator telephone systems in which a plurality of trunks are provided that connect each concentrator with a central office and the number of trunks for each concentrator is less than the number of subscriber lines terminating at the concentrator, means whereby said lines terminating at a concentrator are divided into subgroups each having access to a combination of said trunks less than the total provided for said concentrator, circuit means whereby at least one common trunk is included in each of said combinations of trunks, and preference circuit means whereby said common trunks are the least preferred in each of said combinations.

3. The combination in a line concentrator system of a central office; a plurality of subscriber lines; a plurality of crosspoints remotely located from said central office for each of said lines, each of said crosspoints having a line side and a trunk side and requiring a marking potential on both sides for establishing a line-to-trunk connection; a plurality of trunks greater in number than said plurality of crosspoints for any one of said lines and connecting said crosspoints with said central office; and means for operating any one of said crosspoints for establishing a line-to-trunk connection including means for marking said line sides of all of said crosspoints associated with any one of said lines, means at said central office for determining which ones of said plurality of trunks are connected to said marked crosspoints associated with said line, and means controlled by said determining means for applying a connect potential to the trunk side of one of said crosspoints of said marked plurality of crosspoints associated with said line.

4. In a telephone system, a central office, a group of subscriber lines, a line scanner, a plurality of trunks extending from said central office and being less in number than said group of subscriber lines, a switch serving said subscriber lines and located at a distance from said central office for establishing a connection from any one of said lines to any one of some of said plurality of trunks, means associated with said switch for operating said switch, means in said central office for selecting an idle one of said trunks that is connectable to any one of said lines and for controlling said switch operating means to connect said one of said lines with said central office over said selected trunk, and means to operate said selecting and controlling means under the control of said scanner.

5. A line concentrator trunking system in which a plurality of lines is served by a plurality of trunks, the lines being divided into groups each being connectable to a number of trunks less than the total number provided, the trunks connectable to each group of lines being divided into a plurality of groups with one of said groups of trunks being assigned as first choice trunks to said groups of lines and another of said groups of trunks being assigned as second choice trunks to said groups of lines, said trunks in said second choice group being common to all of said groups of lines, said trunks in said first choice groups of trunks being connectable on a random slip basis, and preference establishing means for determining the order in which the trunks are selected and for distributing the calling load.

6. In a telephone system a central office, a remote line concentrator, a plurality of subscriber lines terminating at said concentrator, a plurality of trunks less in number than said plurality of lines for connecting said concentrator with said central office, a crosspoint network at said concentrator operative in response to a connect potential for connecting said lines to said trunks on a slip-multiple basis, means at said central office for identifying said trunks in any one of the multiples, means at said central office controlled by said identifying means for establishing a preference of selecting said identified trunks, means at said central office controlled by said preference means for selecting the preferred idle one of said identified trunks, and means at said central office for supplying a connect potential over said selected trunk to said network.

7. In a telephone system, a central office, a plurality of subscriber lines, a crosspoint network operative for establishing one of a plurality of possible connections to each of said subscriber lines and located at a distance from said central office, a plurality of trunks less in number than said plurality of lines but more in number than said plurality of connections to each of said lines and extending from said network to said central office, means associated with said network and responsive to the initiation of a call on one of said lines for supplying an identification of said line to said central office, means in said central office controlled by said supplying means for determining which of said plurality of trunks are connectable to said calling line, means controlled by said determining means for selecting an idle one of said trunks connectable to said calling line, means at said central office and controlled by said selecting means for transmitting the calling line and selected trunk identities to said network, and means associated with said network and responsive to the receipt of said calling line and trunk identities from said central office for operating said network.

8. The combination in a line concentrator system of a central office; a plurality of subscriber lines; a plurality of crosspoints for each of said lines and remotely located from said central office; a plurality of trunks greater in number than said plurality of crosspoints for any one of said lines and connecting said crosspoints with said central office; each of said crosspoints having a line side and a trunk side and requiring a marking potential on both sides for establishing a line-to-trunk connection; and means for operating any one of said crosspoints for establishing a line-to-trunk connection including means for marking said line sides of all of said crosspoints associated with any one of said lines, means at said central office for determining which ones of said plurality of trunks are connected to said marked crosspoints associated with said line, circuit means at said central office and controlled by said determining means for establishing a trunk preference, and means at said central office and controlled by said circuit means for applying a connect potential over the preferred idle one of said trunks for marking the trunk side of one of said crosspoints of said marked line side of said plurality of crosspoints associated with said line.

9. The combination in accordance with claim 8 wherein at least one of said trunks is connectable by said crosspoints to any one of said subscriber lines.

10. The combination in accordance with claim 9 wherein said common trunk is always the least preferred by said trunk preference circuit means.

11. In a telephone system, a central office, a plurality of subscriber lines, a crosspoint network providing a plurality of connections to each of said subscriber lines and located at a distance from said central office, a primary switch at said central office, a plurality of trunks less in number than said plurality of lines and more in number than said plurality of connections to each of said lines, said trunks being connected on one side to said network and on the other side to said primary switch, a plurality of links at said central office connected to said switch, means associated with said network and responsive to the initiation of a call on one of said lines for supplying an identification of said line to said central office, means at said central office controlled by said supplying means for determining which of said plurality of trunks are connectable by said network to said calling line, means at said central office for selecting an idle one of said links, means at said central office and controlled by said trunk selecting means and said link selecting means for operating said switch to establish a connection from said selected trunk to said selected link, means controlled by said trunk selecting means for transmitting the selected trunk identity to said network, and means associated with said network for receiving said transmitted identity and for operating said network in accordance therewith to establish a connection from said calling line to said selected trunk.

12. In a telephone system, a central office, a group of subscriber lines, a line scanner, a plurality of trunks extending from said central office and being less in number than said group of subscriber lines, a switch serving said subscriber lines and located at a distance from said central office for establishing a connection from any one of said lines to any one of some of said plurality of trunks, means associated with said switch for operating said switch, means in said central office for selecting an idle one of said trunks that is connectable to any one of said lines and for controlling said switch operating means to connect said one of said lines with said central office over said selected trunk, means at said central office responsive to a disconnect at said one of said lines for applying a disconnect potential to said selected trunk, and means at said central office responsive when another call is being served for delaying said disconnect potential until after the call is served.

13. In a switching system, a central switching station, an auxiliary switching station, a plurality of lines extending from said auxiliary switching station, each of said lines having two electrical conditions, a plurality of trunks less in number than said plurality of lines and being arranged in overlapping groups of trunks, means for connecting said lines to said groups on a slip-multiple basis, means at said auxiliary switching station for determining which one of said groups is connectable to any one of said lines, means at said central switching station for determining which one of said groups is connectable to any one of said lines, means responsive to a change in condition on any one of said lines for initiating the operation of said auxiliary station determining means and of said central station determining means, and means including said connect means and effective upon the operation of said initiating means for establishing a connection from said changed condition line to said central station.

14. A line concentrator trunking system in which a number of subscriber lines are connected by a line concentrator to a smaller number of trunks extending from a central office comprising circuit means at said concentrator providing access from each of said lines to a combination of some of said trunks, means at said central office for determining the identity of said trunks accessible to any one of said lines, and means at said central office controlled by said determining means for establishing a preference for selecting said identified trunks.

15. A line concentrator trunking system in which a number of subscriber lines are connected by a line concentrator to a smaller number of trunks extending from a central office comprising circuit means at said concentrator providing access from each of said lines to a combination of some of said trunks, circuit means at said concentrator providing access from every one of said lines to a particular one of said trunks not included in any of said combinations, and preference establishing means at said central office for establishing said particular trunk as the last preferred one of said trunks to which any one of said lines is accessible.

16. In a telephone system, a central office, a plurality of subscriber lines, a crosspoint network operative for establishing one of a plurality of possible connections to each of said subscriber lines and located at a distance from said central office, a plurality of trunks less in number than said plurality of lines but more in number than said plurality of connections to each of said lines and extending from said network to said central office, means in said central office responsive to the initiation of a call on one of said lines for determining which of said plurality of trunks are connectable to said calling line, means controlled by said determining means for selecting an idle one of said trunks connectable to said calling line, and means at said central office and controlled by said selecting means for initiating the operation of said network.

References Cited in the file of this patent

UNITED STATES PATENTS

| | | |
|---|---|---|
| 2,715,656 | Andrews | Aug. 16, 1955 |
| 2,715,657 | Andrews | Aug. 16, 1955 |
| 2,715,658 | Dunlap et al. | Aug. 16, 1955 |
| 2,724,746 | Bruce et al. | Nov. 22, 1955 |